US008443128B2

(12) United States Patent  (10) Patent No.: US 8,443,128 B2
Nakano  (45) Date of Patent: May 14, 2013

(54) HIGH PERFORMANCE EXTENSION DEVICE

(75) Inventor: Masayoshi Nakano, Machida (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 150 days.

(21) Appl. No.: 13/046,886

(22) Filed: Mar. 14, 2011

(65) Prior Publication Data

US 2012/0239842 A1 Sep. 20, 2012

(51) Int. Cl.
G06F 13/36 (2006.01)
(52) U.S. Cl.
USPC ............... 710/306; 710/305; 710/316
(58) Field of Classification Search .......... 710/305–306, 710/313, 316–317
See application file for complete search history.

(56) References Cited

U.S. PATENT DOCUMENTS

| 7,478,191 B2* | 1/2009 | Wurzburg et al. ............ 710/316 |
| 7,769,940 B2* | 8/2010 | Wiler ............................ 710/316 |
| 2005/0216620 A1* | 9/2005 | Sandulescu et al. ............ 710/62 |
| 2006/0020732 A1 | 1/2006 | Charna |
| 2006/0085584 A1 | 4/2006 | Chen et al. |
| 2010/0262726 A1* | 10/2010 | Tauscher et al. ................ 710/16 |
| 2011/0119666 A1* | 5/2011 | Flynn .................................. 718/1 |
| 2012/0066425 A1* | 3/2012 | Zeng et al. ..................... 710/303 |

OTHER PUBLICATIONS

Lenovo USB Port Replicator with Digital Video User Guide.
High-/Full-Speed USB 2.0 Switches.
Monitors Made Easy with USB.

* cited by examiner

Primary Examiner — Brian Misiura
Assistant Examiner — Kim Huynh
(74) Attorney, Agent, or Firm — Nutter McClennen & Fish LLP; John J. Penny, Jr.; Christina M. Sperry

(57) ABSTRACT

An extension device for connecting one or more peripheral devices to a computer, comprising a first bus for connecting to the computer; a second bus for connecting to the computer; a hub coupled to the first bus for connecting the computer to one or more peripheral devices; a controller for connecting the computer to a high-bandwidth device, the controller being switchably coupled to the hub and the second bus; and a switch for switching the controller, from being coupled to the hub, to being coupled to the second bus, when a connection to the computer is detected on the second bus.

18 Claims, 4 Drawing Sheets

HIGH PERFORMANCE EXTENSION DEVICE

BACKGROUND OF THE INVENTION

Portable computing devices such as laptop computers, netbooks, or tablet computers are typically constrained by their size or weight requirements and therefore provide a minimal number of connection ports (e.g. 1 or 2 USB ports and 1 display device port) for attaching peripheral devices. Therefore, it is common for users to supplement the number of built-in connection ports with an extension device such as a port replicator, a connection hub, or a docking station that provides additional connection ports. Similarly, extension devices are often used to maintain a predetermined configuration of connections to peripheral devices in order to eliminate the hassle of connecting and disconnecting peripheral devices individually. Accordingly, conventional extension devices are designed to provide an extended set of connections to typical peripheral devices and to provide a single or reduce set of corresponding connectors.

FIG. 1 depicts a conventional extension device 100. The extension device 100 provides a connection port 101 and a bus 102 for coupling a hub 103 to a computer. For example, bus 102 and connection port 101 may be a universal serial bus (USB) and a USB port, respectively. The hub 103 in turn connects the bus 102 to a plurality of peripheral devices 110 and 112.

The peripheral device 110 may be a device that requires a high-bandwidth connection with the computer. Accordingly, the extension device 100 may provide a high-bandwidth controller 120 for processing data transmitted over the high-bandwidth connection between the computer and the peripheral device 110. For example, if the high-bandwidth peripheral device 110 is a USB display device, the high-bandwidth controller 120 may be a digital graphical controller for processing the data transmitted between the computer and the USB display device.

Furthermore, the conventional extension device 100 typically requires an addressable controller 104 for maintaining the connection between the computer and the extension device 100.

Conventional extension device 100, however, exhibits several disadvantages. First, as the number of peripheral devices 110 and 112 attached to the hub 103 increases, the connection throughput to the computer may be degraded due to the competition between the peripheral devices 110 and 112. For example, since the hub 103 cannot prioritize or isolate the connection to the high-bandwidth device 110 from the connections to the one or more peripheral devices 112, the connection quality between the computer and the high-bandwidth device 110 is degraded when the number of peripheral devices 112 increases. Similarly, the connection quality to the high-bandwidth peripheral device 110 is degraded when the connection activity between the computer and the one or more peripheral devices 112 increases.

Second, the hub 103, by itself, degrades the quality of connections across it. For example, the hub may inherently introduce physical or electrical imperfections such as contact resistance or impedance, which degrade the connection quality across the hub. Also, the addressable controller 104 typically requires a software driver, which is installed on the computer and requires some connection bandwidth when it communicates with the computer. Thus, the hub 103 competes with the connection activities of the peripheral devices 110 and 112, thereby degrading the connection quality.

Accordingly, conventional extension devices are generally inadequate in maintaining a quality high-bandwidth connection with devices such as a display, a scanner, or a projector, etc. In the case of a display, the degradation causes dropped frames, for example. Furthermore, the conventional extension devices may require additional software configuration by the user, thereby adding unwanted complexity.

SUMMARY OF THE INVENTION

There is provided an extension device for connecting one or more peripheral devices to a computer, comprising a first bus for connecting to the computer; a second bus for connecting to the computer; a hub coupled to the first bus for connecting the computer to one or more peripheral devices; a controller for connecting the computer to a high-bandwidth device, the controller being switchably coupled to the hub and the second bus; and a switch for switching the controller, from being coupled to the hub, to being coupled to the second bus, when a connection to the computer is detected on the second bus.

According to another aspect of the invention, there is provided a method of connecting one or more peripheral devices to a computer, the method comprising providing a first bus for connecting to the computer; providing a second bus for connecting to the computer; coupling a hub to the first bus for connecting the computer to one or more peripheral devices; switchably coupling a controller for connecting the computer to a high-bandwidth device, the controlling being switchably coupled to the hub and the second bus; detecting a connection to the computer on the second bus; and switching the controller, from being coupled to the hub, to being coupled to the second bus, when the connection to the computer is detected on the second bus.

According to another aspect of the invention, there is provided a method of connecting one or more peripheral devices to a computer, the method comprising providing a first bus for connecting to the computer; providing a second bus for connecting to the computer; coupling a hub to the first bus for connecting the computer to one or more peripheral devices; switchably coupling a controller for connecting the computer to a high-bandwidth device, the controlling being switchably coupled to the hub and the second bus; detecting a connection to the computer on the second bus; and switching the controller, from being coupled to the hub, to being coupled to the second bus, when the connection to the computer is detected on the second bus, so as to isolate the connection to the computer on the second bus from the connection to the computer on the first bus.

DETAILED DESCRIPTION

Figure 1:
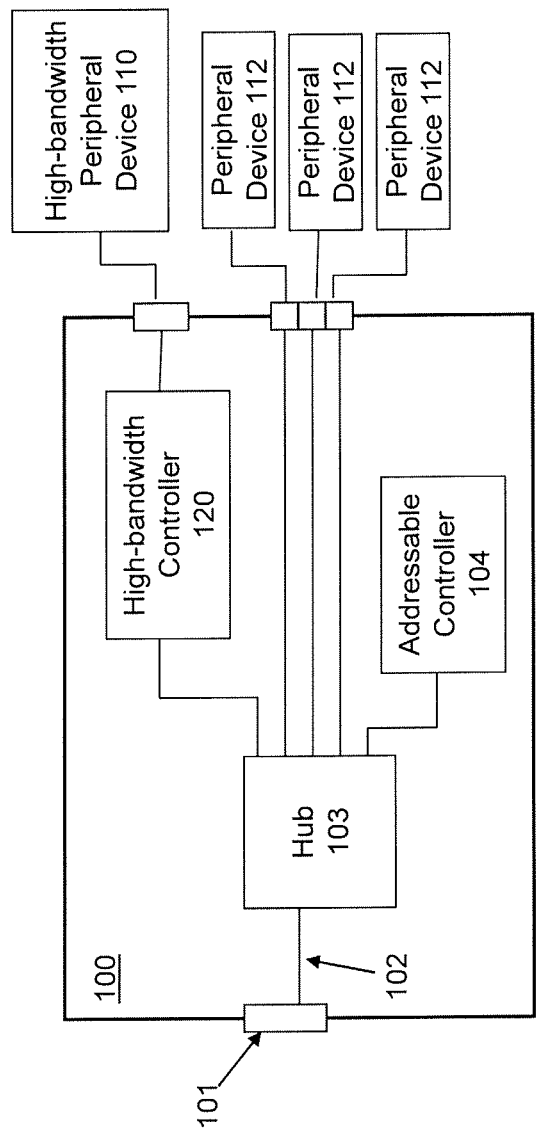
FIG. 1 depicts a conventional extension device.
Figure 2:
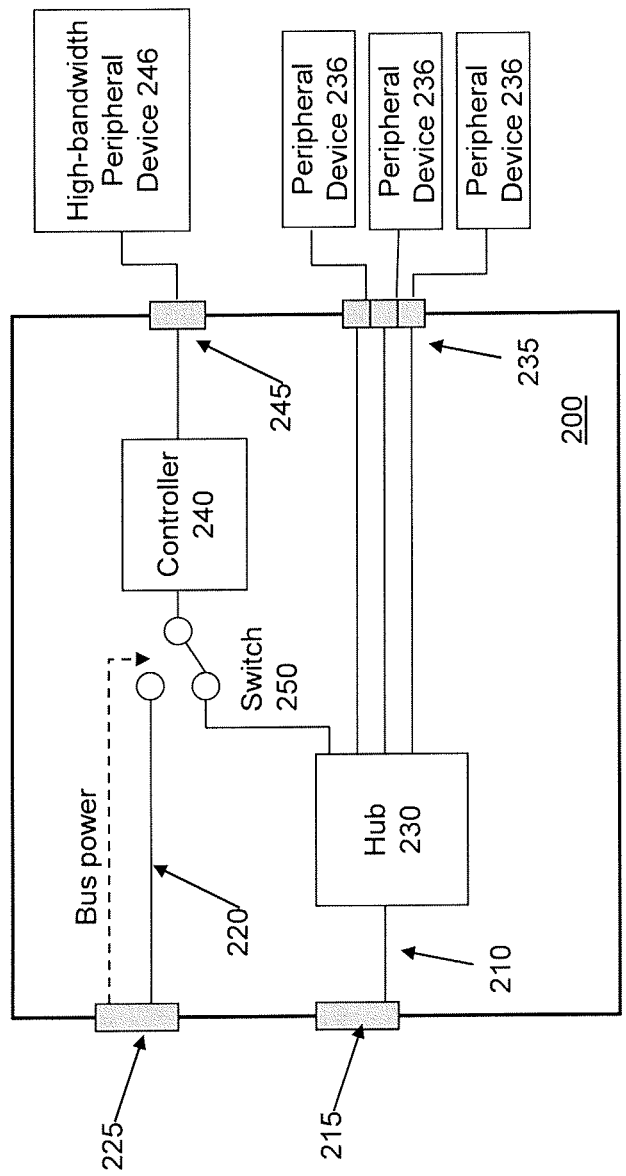
FIG. 2 depicts a extension device according to the invention.

FIG. 2 depicts an extension device according to an embodiment of the present invention. In particular, the extension device 200 provides a computer, or another type of computing device connection to one or more peripheral devices. The extension device 200 includes a first bus 210 for connecting to the computer, a second bus 220 for optionally connecting to the computer, and a hub 230 coupled to the first bus for connecting the computer to one or more peripheral devices 236. The extension device 200 further includes a controller 240 for connecting the computer to a high-bandwidth device 246. The controller is switchably coupled to the hub 230 and the second bus 220. Also, the extension device 200 includes a switch 250 for switching the controller, from being coupled to the hub 230, to being coupled to the second bus 220. According to an aspect of the embodiment, the controller is switched to be coupled to the second bus 200 when a connection to the computer is detected on the second bus. The extension device further includes a first connection port 215 for coupling the first bus 210 to the computer, and a second connection port 220 for coupling the second bus 220 to the computer.

According to a preferred embodiment, the extension device 200 further includes one or more connection ports 235. The hub 230 connects the computer to one or more peripheral devices 236 through the connection ports 235. Also, the hub 200 includes a connection port 245 and the controller 240 connects the computer to a high-bandwidth device through the connection port 245.

The buses 210 and 220, and the connection ports 215, 225, 235, and 245 can be any type or types of connection buses and connection ports, respectively, for connecting peripheral devices. For example, the buses 210 and 220 can be both USB buses and the ports 215 and 225 can be both USB ports. As another example, bus 210 can be a USB 2.0 compliant bus while the bus 220 can be a USB 3.0 compliant bus. For another example, port 245 can be an IEEE 1449 port while the ports 235 can be USB 1.0 compliant ports. The controller 240 can be any type of display controllers. For example, DL120 or DL160 from DisplayLink can be used (available from www.displaylink.com).

According to a preferred embodiment, the extension device 200 can operate in one of two modes by switching the controller, from being coupled to the hub 230 in a first mode to being coupled to the second bus 220 in a second mode.

Figure 3:
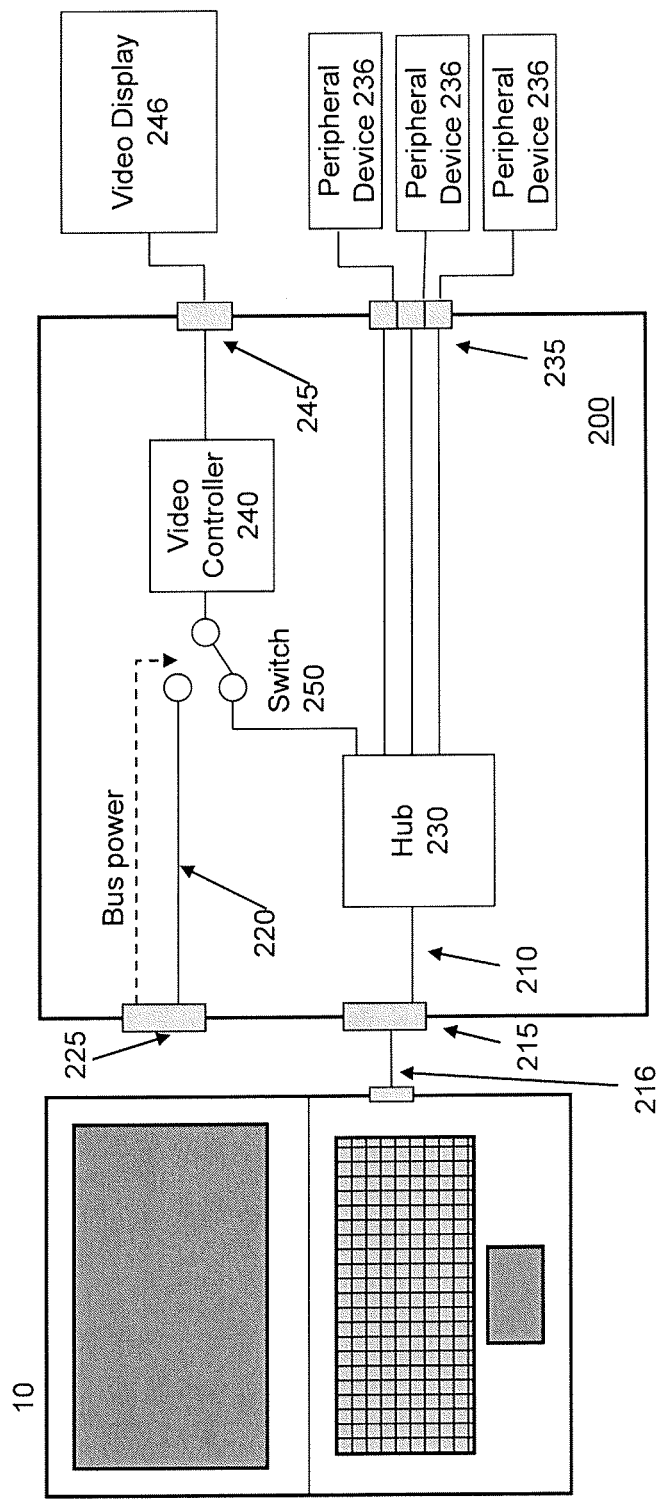
FIG. 3 depicts a extension device operating in a first mode.

FIG. 3 depicts an extension device operating in a first mode. In particular, in the first mode, the controller 240 is a video controller and is coupled to the hub 230. Therefore, a connection between the controller 240 and the computer 10 is maintained across bus 210 and through hub 230. Therefore, the connection between a video display 246 and the computer is subjected to the competing connections between the peripheral devices 236 and the computer. The advantage of operating in the first mode is that the computer 10 is only required to maintain a single connection 216 with the extension device 200.

Figure 4:
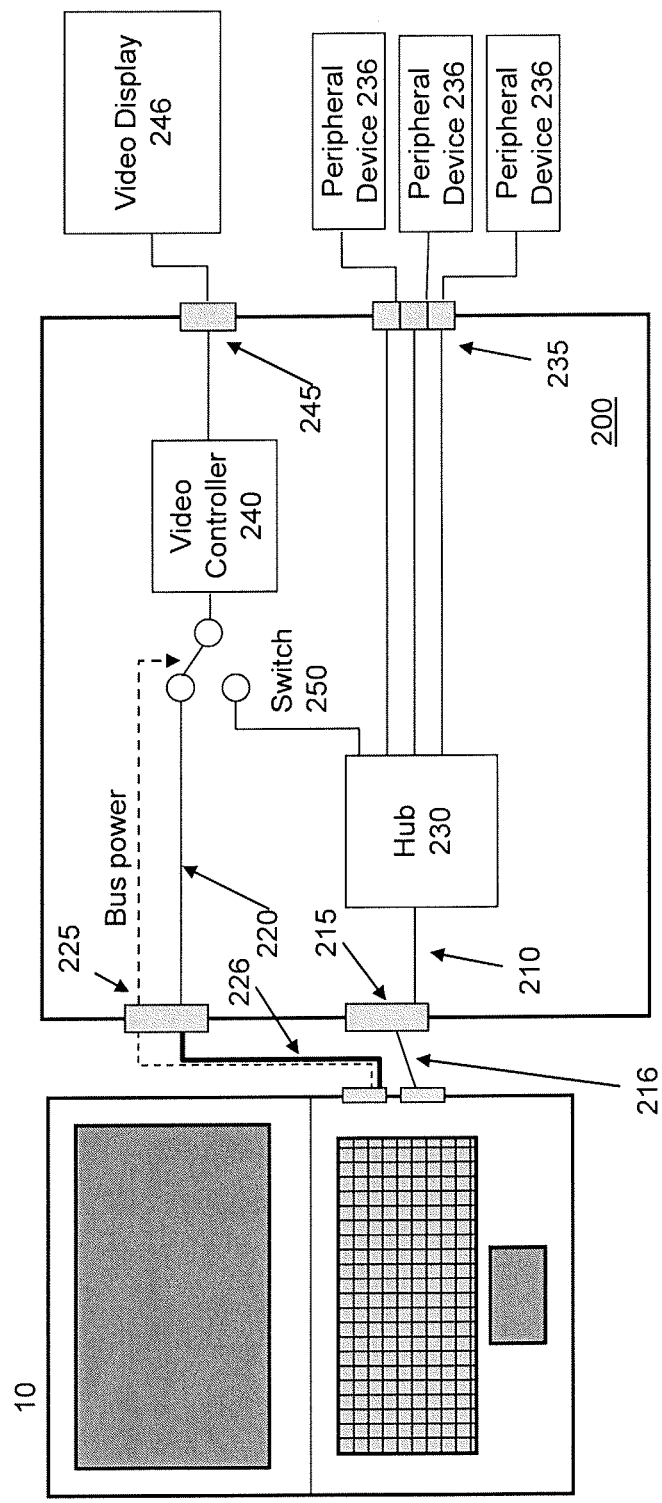
FIG. 4 depicts a extension device operating in a second mode.

FIG. 4 depicts an extension device operating in a second mode. As shown in FIG. 4, the controller 240 is switched by a switch 250 to be coupled to the second bus 220 in a second mode. Therefore, in the second mode, a connection between the video display 246 and the computer 10 is isolated from the connections between the peripheral devices 236 and the computer. In the second mode, the computer 10 may still prioritize its connections amongst the video display 246 and the peripheral devices 236. However, the connection between the video display 246 and the computer is no longer subjected to competition from connections between the peripheral devices 236 and the computer.

In the second mode, the computer 10 makes a second connection 226 with the extension device 200. Here, since the second bus 220 connects the computer directly to the video controller 240, no software driver for the extension device 200 is required. Therefore, an advantage of the second mode is that the peripheral devices 236 no longer interferes or competes with the video display 246, and the user does not have to install or configure additional software for the extension device 200. Here, the first and second connections 216 and 226 can be made by two USB cables or any other cables for connecting a computer to a peripheral device.

Here, the switch 250 can be any type of high-speed switches. For, example, any one of the high-/full-speed USB 2.0 switches available from Maxim can be used (MAX4906, MAX4606F, MAX4907, and MAX4907F, available from www.maxim-ic.com).

According to a preferred embodiment, the extension device 200 switches between operating in the first mode and operating in the second mode when the switch 250 detects a bus power on the second bus 220. In particular, the switch 250 switches the controller 240 from being coupled to the hub 230 to be coupled to bus 220 when the switch 250 detects a bus power on the second bus 220.

According to another preferred embodiment, the switch 250 detects the connection to the computer on the second bus by detecting a user effected switch. For example, the user effected switch can be a mechanical switch, a button, or any other user controllable switch.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. An extension device for connecting one or more peripheral devices to a computer, comprising:
   a first bus for connecting to the computer;
   a second bus for connecting to the computer;
   a hub coupled to the first bus for connecting the computer to one or more peripheral devices;
   a controller for connecting the computer to a high-bandwidth device, the controller being switchably coupled to the hub and the second bus; and
   a switch for switching the controller, from being coupled to the hub, to being coupled to the second bus, when a connection to the computer is detected on the second bus.

2. The extension device of claim 1, further comprising:
   a first connection port for coupling the first bus to the computer.

3. The extension device of claim 1, further comprising:
   a second connection port for coupling the second bus to the computer.

4. The extension device of claim 1, further comprising:
   one or more connection ports, wherein
   the hub connects the computer to one or more peripheral devices through the one or more connection ports.

5. The extension device of claim 1, further comprising:
   a connection port, wherein
   the controller connects the computer to the high-bandwidth device through the connection port.

6. The extension device of claim 2, wherein the first bus is a universal serial bus.

7. The extension device of claim 3, wherein the second bus is a universal serial bus.

8. The extension device of claim 1, wherein the switch detects the connection to the computer on the second bus by detecting a bus power on the second bus.

9. The extension device of claim 1, wherein the switch detects the connection to the computer on the second bus by detecting a user effected switch.

10. The extension device of claim 9, wherein the user effected switch is any one of a mechanical switch, a button, and a relay.

11. A method of connecting one or more peripheral devices to a computer, the method comprising:
   providing a first bus for connecting to the computer;
   providing a second bus for connecting to the computer;
   coupling a hub to the first bus for connecting the computer to one or more peripheral devices;
   switchably coupling a controller for connecting the computer to a high-bandwidth device, the controlling being switchably coupled to the hub and the second bus;
   detecting a connection to the computer on the second bus; and
   switching the controller, from being coupled to the hub, to being coupled to the second bus, when the connection to the computer is detected on the second bus.

12. A method of connecting one or more peripheral devices to a computer, the method comprising:
   providing a first bus for connecting to the computer;
   providing a second bus for connecting to the computer;
   coupling a hub to the first bus for connecting the computer to one or more peripheral devices;
   switchably coupling a controller for connecting the computer to a high-bandwidth device, the controlling being switchably coupled to the hub and the second bus;
   detecting a connection to the computer on the second bus; and
   switching the controller, from being coupled to the hub, to being coupled to the second bus, when the connection to the computer is detected on the second bus, so as to isolate the connection to the computer on the second bus from the connection to the computer on the first bus.

13. The extension device of claim 1, wherein the second bus is for connecting the high-bandwidth device to the computer.

14. The extension device of claim 1, wherein a signal for connecting the computer to the high-bandwidth device does not pass through the hub.

15. The extension device of claim 1, wherein the switch is switched to being coupled to the second bus when the connection to the computer is detected on the second bus regardless of a type of high-bandwidth device connected thereto.

16. The extension device of claim 1, wherein detecting the connection comprises detecting a bus power on the second bus, and the switch is switched regardless of a type of the high-bandwidth device connected to the computer via the second bus.

17. The method of claim 11, wherein detecting the connection comprises detecting a connection of the high-bandwidth device to the computer on the second bus.

18. The method of claim 11, wherein detecting the connection comprises detecting a bus power on the second bus, and the switch is switched regardless of a type of the high-bandwidth device connected to the computer via the second bus.

* * * * *